(12) United States Patent
Aburada et al.

(10) Patent No.: US 10,343,943 B2
(45) Date of Patent: Jul. 9, 2019

(54) GLASS MANUFACTURING APPARATUS AND METHODS

(71) Applicant: Corning Incorporated, Corning, NY (US)

(72) Inventors: Tomohiro Aburada, Kakegawa (JP); Jeffrey Robert Amadon, Lexington, KY (US); Chris Scott Kogge, Danville, KY (US); Gautam Narendra Kudva, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 822 days.

(21) Appl. No.: 14/260,925

(22) Filed: Apr. 24, 2014

(65) Prior Publication Data

US 2015/0307384 A1 Oct. 29, 2015

(51) Int. Cl.
C03B 17/06 (2006.01)

(52) U.S. Cl.
CPC .......... *C03B 17/068* (2013.01); *C03B 17/064* (2013.01)

(58) Field of Classification Search
CPC .................................................. C03B 17/068
See application file for complete search history.

(56) References Cited

U.S. PATENT DOCUMENTS

| | | | |
|---|---|---|---|
| 4,809,573 A | 3/1989 | Welch | |
| 8,627,684 B2 | 1/2014 | Shultz et al. | |
| 2009/0107182 A1 | 4/2009 | Anderson et al. | |
| 2012/0004084 A1* | 1/2012 | Neubauer | C03B 17/068 492/40 |
| 2012/0294662 A1 | 11/2012 | Schnabel et al. | |
| 2012/0304695 A1 | 12/2012 | Lakota et al. | |
| 2013/0133369 A1 | 5/2013 | Lock | |
| 2013/0133371 A1 | 5/2013 | Burdette et al. | |
| 2013/0219964 A1 | 8/2013 | Kudva | |
| 2013/0319050 A1* | 12/2013 | Agrawal | C03B 17/068 65/91 |

FOREIGN PATENT DOCUMENTS

| | | |
|---|---|---|
| CN | 102292299 A | 12/2011 |
| DE | 527186 C1 | 6/1931 |

(Continued)

OTHER PUBLICATIONS

European Patent Office; International Search Report; dated Jul. 27, 2015; pp. 1-4.

(Continued)

*Primary Examiner* — Cynthia Szewczyk
(74) *Attorney, Agent, or Firm* — Kevin M. Able

(57) ABSTRACT

A glass manufacturing apparatus comprises a forming device configured to produce a glass ribbon and a control device configured to independently operate a first pull roll apparatus and a second pull roll apparatus such that the first pull roll apparatus rotates with a substantially constant torque the second pull roll apparatus rotates with a substantially constant angular velocity. The control device is further configured to adjust the substantially constant torque of the first pull roll apparatus based on an operating condition of at least one of the first pull roll apparatus and the second pull roll apparatus. In further examples, methods of manufacturing a glass ribbon are provided.

23 Claims, 10 Drawing Sheets

(56) References Cited

FOREIGN PATENT DOCUMENTS

EP    1739062 A1    1/2007
JP    2009107913 A    5/2009
WO    2010141832 A1    12/2010

OTHER PUBLICATIONS

English Translation of CN201580034223.2 Office Action dated Oct. 16, 2018; 11 pages; Chinese Patent Office.
English Translation of JP2016563824 Office Action dated Feb. 20, 2019; 9 Pages; Japanese Patent Office.

* cited by examiner

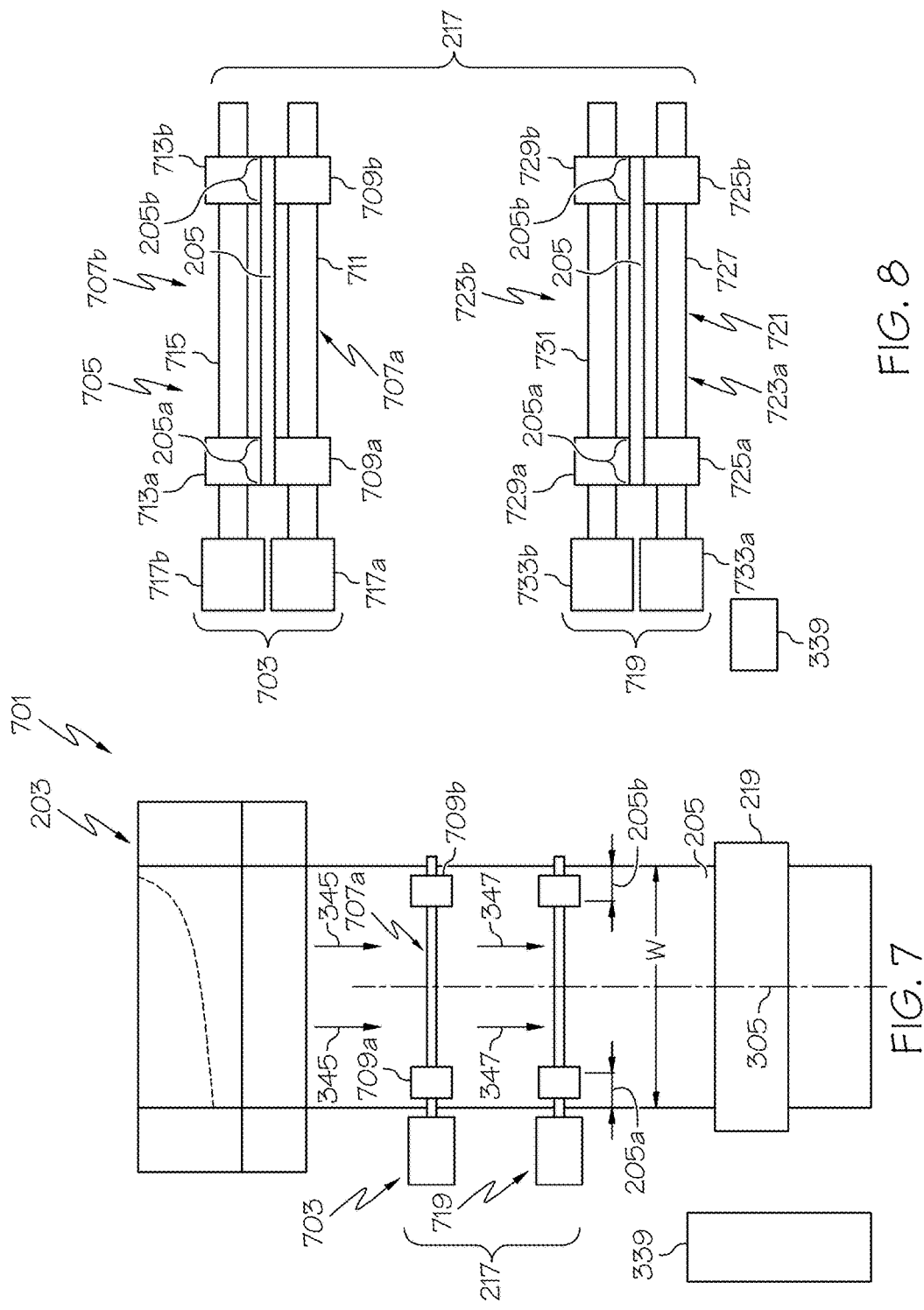

GLASS MANUFACTURING APPARATUS AND METHODS

TECHNICAL FIELD

The present disclosure relates generally to glass manufacturing apparatus and methods and, more particularly, to glass manufacturing apparatus and methods with a first pull roll apparatus, a second pull roll apparatus, and a control device.

BACKGROUND

Glass manufacturing apparatus are known to produce glass sheets, for example, by a fusion down draw process. U.S. Pat. No. 8,627,684 to Shultz et al. that issued on Jan. 14, 2014 discloses an example glass manufacturing apparatus with a lower pull roll apparatus having a master motor to rotate a lower pair of rolls at a constant angular velocity. The glass manufacturing apparatus further includes an upper pull roll apparatus with upper slave motors configured to rotate an upper pair of rolls at torques that match a predetermined percentage of the measured torque of the master motor of the lower pair of rolls.

The master and slave configuration of the lower and upper pull roll apparatus of the Shultz et al. patent can be beneficial under various process applications. However, perturbations from the glass ribbon growth and sheet formation may propagate to the upper pair of rolls. For example, FIG. 1A illustrates an example graph of a master and slave configuration where the vertical "Y-axis" is force (pounds) and the horizontal "X-axis" is time (minutes:seconds). One plot 101 represents the force being applied to the glass ribbon by the lower rolls while the other plot 103 represents the force being applied to the glass ribbon by the upper rolls. As shown, each plot 101, 103 includes a saw-tooth force pattern with a first force pattern 105 representing glass ribbon growth and a second force pattern 107 representing separating of a glass sheet from the glass ribbon.

U.S. Patent Application Publication No. 2013/0133371 that published on May 30, 2013, to Burdette et al. (hereinafter the Burdette et al. publication), discloses an example glass manufacturing apparatus including a forming device configured to produce a glass ribbon, a pull roll device, and a control device. The control device of Burdette et al. is configured to independently operate an upper pull roll apparatus and a lower pull roll apparatus such that the upper pull roll apparatus rotates with a substantially constant torque and the lower pull roll apparatus rotates with a substantially constant angular velocity. The independent operating configuration of the upper and lower pull roll apparatus of the Burdette et al. publication can also be beneficial under various process applications.

For example, FIG. 1B illustrates a graph of an example independent operating configuration of a pull roll device, representative of the Burdette et al. publication, where the vertical "Y-axis" is force (pounds) and the horizontal "X-axis" is time (minutes:seconds). One plot 111 represents the force being applied to the glass ribbon by the lower pull roll apparatus while the other plot 113 represents the force being applied to the glass ribbon by the upper pull roll apparatus. As shown, the plot 113 remains substantially constant as the upper pull roll apparatus rotates with a substantially constant torque and thus applies a substantially constant force to the glass ribbon while the plot 111 varies as the lower pull roll apparatus rotates with a substantially constant angular velocity and thus applies a varying force to the glass ribbon. As further shown, in contrast to the plot 103 of the Shultz et al. patent, the plot 113 is independent from the plot 111 as the force being applied to the glass ribbon by the upper pull roll apparatus is independent of the force being applied to the glass ribbon by the lower pull roll apparatus.

As further shown in FIG. 1B, a third force pattern 115 of the plot 111 represents, for example, the changing force as the glass ribbon increases in length while the fourth force pattern 117 represents, for example, the sudden change in force that occurs during separation of a glass sheet from the glass ribbon. During the same period of time, the constant torque of the upper pull roll apparatus can maintain a substantially constant force to the glass ribbon. As such, force disturbances at or below the lower pull roll apparatus can be prevented from being transmitted up the glass ribbon into the setting zone where stress concentrations and corresponding surface defects may be undesirably frozen into the glass ribbon.

However, a change in a characteristic of the glass ribbon, for example, can produce a corresponding change in an operating condition of at least one of the upper pull roll apparatus which rotates with a substantially constant torque and the lower pull roll apparatus which rotates with a substantially constant angular velocity. The corresponding change in the operating condition can affect, for example, a quality of the glass ribbon.

For example, FIG. 1C, illustrates a graph of an example independent operating configuration of a pull roll device, representative of the Burdette et al. publication, where the vertical "left Y-axis" is a change in force (pounds), the vertical "right Y-axis" is a change in viscosity of the glass ribbon at the root (%), and the X-axis is time (minutes:seconds). One plot 121 represents the change in force being applied to the glass ribbon by the lower pull roll apparatus while the other plot 123 represents the change in force being applied to the glass ribbon by the upper pull roll apparatus. As shown, the plot 123 remains substantially constant as the upper pull roll apparatus rotates with a substantially constant torque and thus applies a substantially constant force to the glass ribbon while the plot 121 varies as the lower pull roll apparatus rotates with a substantially constant angular velocity and thus applies a varying force to the glass ribbon for reasons discussed with respect to plot 125 below.

FIG. 1C also represents how a change in a characteristic of the glass ribbon over a period of time can change the force differential applied to the glass ribbon by the upper pull roll apparatus and the lower pull roll apparatus. In particular, FIG. 1C demonstrates how a change in "root viscosity" (i.e., the viscosity of the glass ribbon at the root of the forming wedge) over a period of time can change the force differential applied to the glass ribbon by the upper pull roll apparatus and the lower pull roll apparatus. For instance, FIG. 1C demonstrates that as the change in root viscosity (plot 125) increases over a period of time, the corresponding force being applied to the glass ribbon by the lower pull roll apparatus (plot 121) likewise changes over the same period of time. However, as demonstrated by plot 123, the force being applied to the glass ribbon by the upper pull roll apparatus remains constant over the period of time since the upper pull roll apparatus rotates with a substantially constant torque. Consequently, a first force differential 127 at a first time (i.e., 12:00) is significantly less than a second force differential 129 at a subsequent second time (i.e., 12:57) due to a corresponding increase in root viscosity. Thus, independently operating the upper pull roll apparatus and the lower pull roll apparatus such that the upper pull roll apparatus rotates with a substantially constant torque and the lower pull roll apparatus rotates with a substantially constant angular velocity (e.g., as set forth by the Burdette et al. publication) may result in a significant change in the force differential over time in response to a change in a characteristic of the glass ribbon (e.g., root viscosity) over the same period of time.

SUMMARY

The following presents a simplified summary of the disclosure in order to provide a basic understanding of some example aspects described in the detailed description.

In a first aspect of the disclosure, a glass manufacturing apparatus comprises a forming device configured to produce a glass ribbon including a width. The glass manufacturing apparatus further includes a first pull roll apparatus configured to draw the glass ribbon from the forming device along a draw path extending transverse to the width of the glass ribbon. The glass manufacturing apparatus also includes a second pull roll apparatus positioned downstream along the draw path from the first pull roll apparatus, wherein the second pull roll apparatus is configured to further draw the glass ribbon along the draw path. The glass manufacturing apparatus further includes a control device configured to independently operate the first pull roll apparatus and the second pull roll apparatus such that the first pull roll apparatus rotates with a substantially constant torque and the second pull roll apparatus rotates with a substantially constant angular velocity. The control device is further configured to adjust the substantially constant torque of the first pull roll apparatus based on an operating condition of at least one of the first pull roll apparatus and the second pull roll apparatus.

In one example of the first aspect, the operating condition is determined over a period of time.

In another example of the first aspect, the operating condition includes a torque of at least one of the first pull roll apparatus and the second pull roll apparatus. In one example, the torque is determined over a period of time.

In yet another example of the first aspect, the operating condition includes an average torque of at least one of the first pull roll apparatus and the second pull roll apparatus. In one example, the average torque is determined over a period of time.

In still another example of the first aspect, the operating condition includes a difference in torque between the first pull roll apparatus and the second pull roll apparatus. In one example, the difference in torque is determined over a period of time.

In another example of the first aspect, the operating condition includes a difference in an average torque between the first pull roll apparatus and the second pull roll apparatus. In one example, the difference in an average torque is determined over a period of time.

The first aspect may be provided alone or in combination with one or any combination of the examples of the first aspect discussed above.

In a second aspect of the disclosure, a method of manufacturing a glass ribbon comprises the step of forming a glass ribbon including a width. The method further includes the step of independently operating a first pull roll apparatus such that the first pull roll apparatus rotates with a substantially constant torque to draw the glass ribbon along a draw path extending transverse to the width of the glass ribbon. The method further includes the step of independently operating a second pull roll apparatus such that the second pull roll apparatus rotates with a substantially constant angular velocity to further draw the glass ribbon along the draw path. The method further includes the step of adjusting the substantially constant torque of the first pull roll apparatus based on an operating condition of at least one of the first pull roll apparatus and the second pull roll apparatus.

In one example of the second aspect, the operating condition is determined over a period of time.

In another example of the second aspect, the operating condition includes a torque of at least one of the first pull roll apparatus and the second pull roll apparatus. In one example, the torque is determined over a period of time.

In yet another example of the second aspect, the operating condition includes an average torque of at least one of the first pull roll apparatus and the second pull roll apparatus. In one example, the average torque is determined over a period of time.

In still another example of the second aspect, the operating condition includes a difference in torque between the first pull roll apparatus and the second pull roll apparatus. In one example, the difference in torque is determined over a period of time.

In another example of the second aspect, the operating condition includes a difference in an average torque between the first pull roll apparatus and the second pull roll apparatus. In one example, the difference in an average torque is determined over a period of time.

The second aspect may be provided alone or in combination with one or any combination of the examples of the second aspect discussed above.

In a third aspect of the disclosure, a method of manufacturing a glass ribbon comprises the step of forming a glass ribbon including a width. The method further includes the step of independently operating a first pull roll apparatus such that the first pull roll apparatus rotates with a substantially constant torque to draw the glass ribbon along a draw path extending transverse to the width of the glass ribbon. The method still further includes the step of independently operating a second pull roll apparatus such that the second pull roll apparatus rotates with a substantially constant angular velocity to further draw the glass ribbon along the draw path. The method further includes the step of monitoring a force differential between the first pull roll apparatus and the second pull roll apparatus. The method further includes the step of adjusting the substantially constant torque of the first pull roll apparatus to an adjusted torque in response to the force differential exceeding a predetermined range of force differentials. The method further includes the step of continuing to independently operate the first pull roll apparatus such that the first pull roll apparatus rotates with a substantially constant adjusted torque while the force differential is within the predetermined range of force differentials.

In one example of the third aspect, the step of adjusting the substantially constant torque of the first pull roll apparatus comprises a stepped adjustment.

In another example of the third aspect, the step of continuing to independently operate the first pull roll apparatus comprises a ramped adjustment over a period of time.

BRIEF DESCRIPTION OF THE DRAWINGS

These and other aspects are better understood when the following detailed description is read with reference to the accompanying drawings, in which:

FIG. 7 is a schematic front view of another pull roll device in accordance with aspects of the disclosure;

FIG. 8 is a top view of a first example pull roll apparatus and a second example pull roll apparatus of the example pull roll device of FIG. 7.

DETAILED DESCRIPTION

Figure 1A:
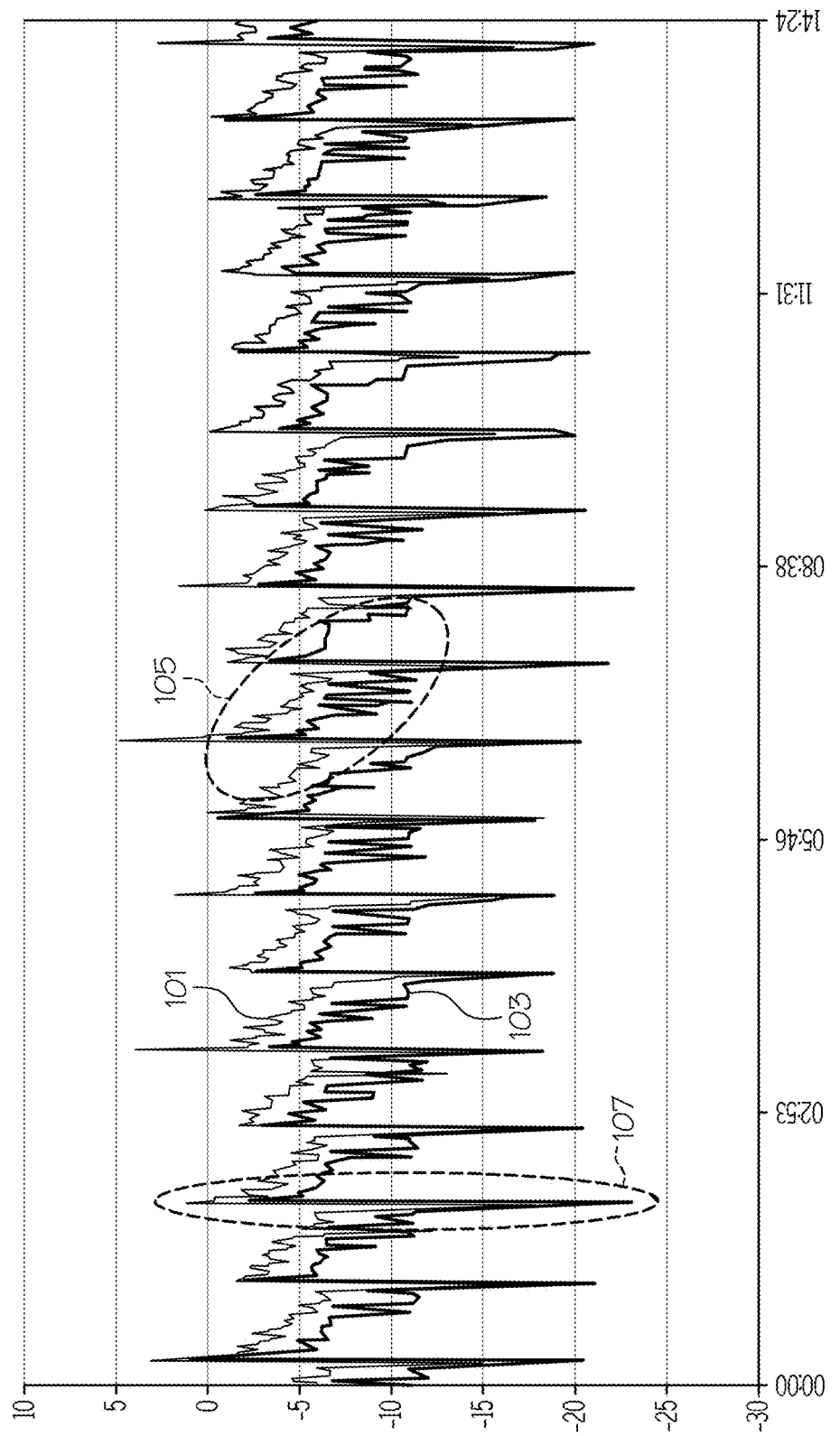
FIG. 1A illustrates a graph of example forces applied to the glass ribbon by a glass manufacturing apparatus with a pull roll device operating in a dependent master and slave configuration.
Figure 1B:
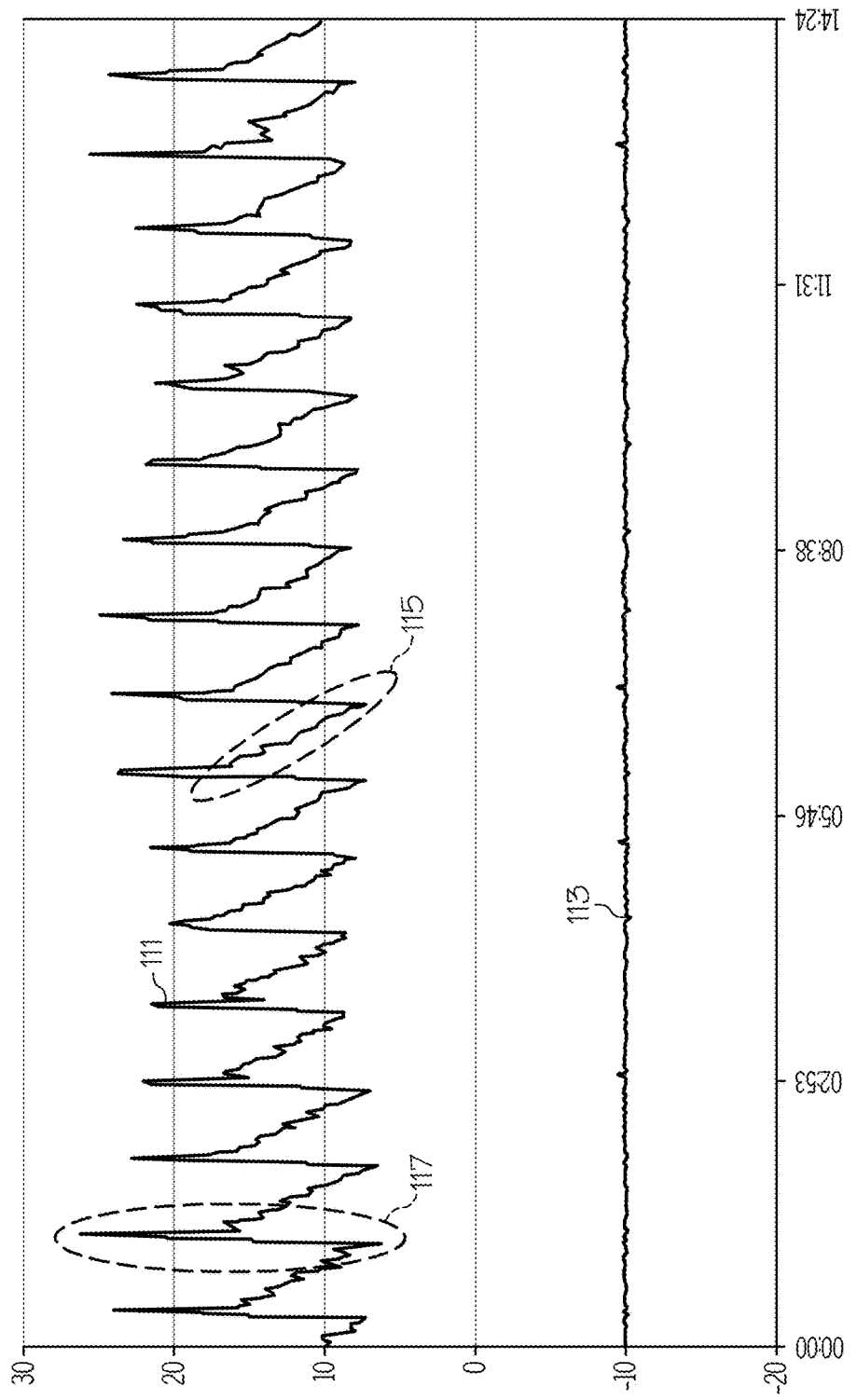
FIG. 1B illustrates a graph of example forces applied to the glass ribbon by a glass manufacturing apparatus with a pull roll device operating in an independent configuration.
Figure 1C:
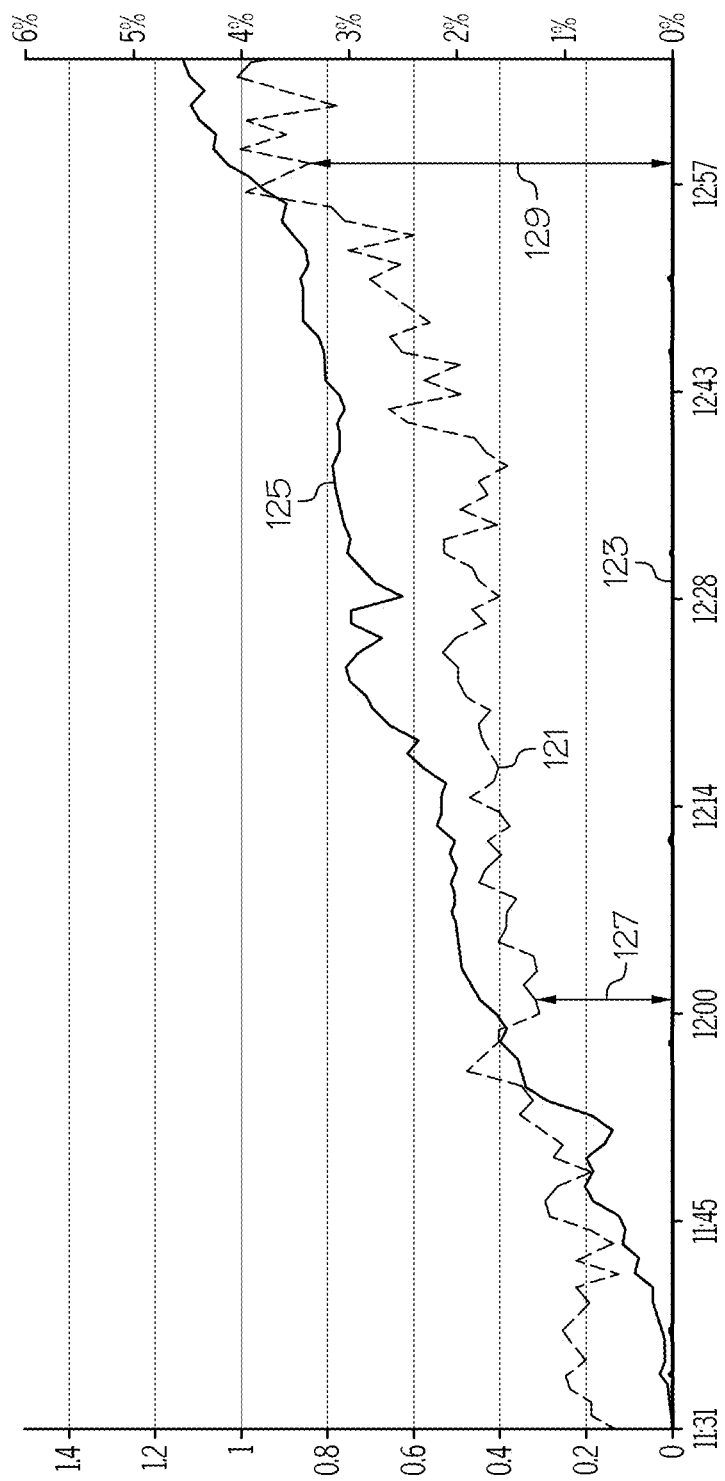
FIG. 1C illustrates a graph of example forces applied to the glass ribbon by a glass manufacturing apparatus with a pull roll device operating in an independent configuration with a root viscosity changing over a period of time.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 2:
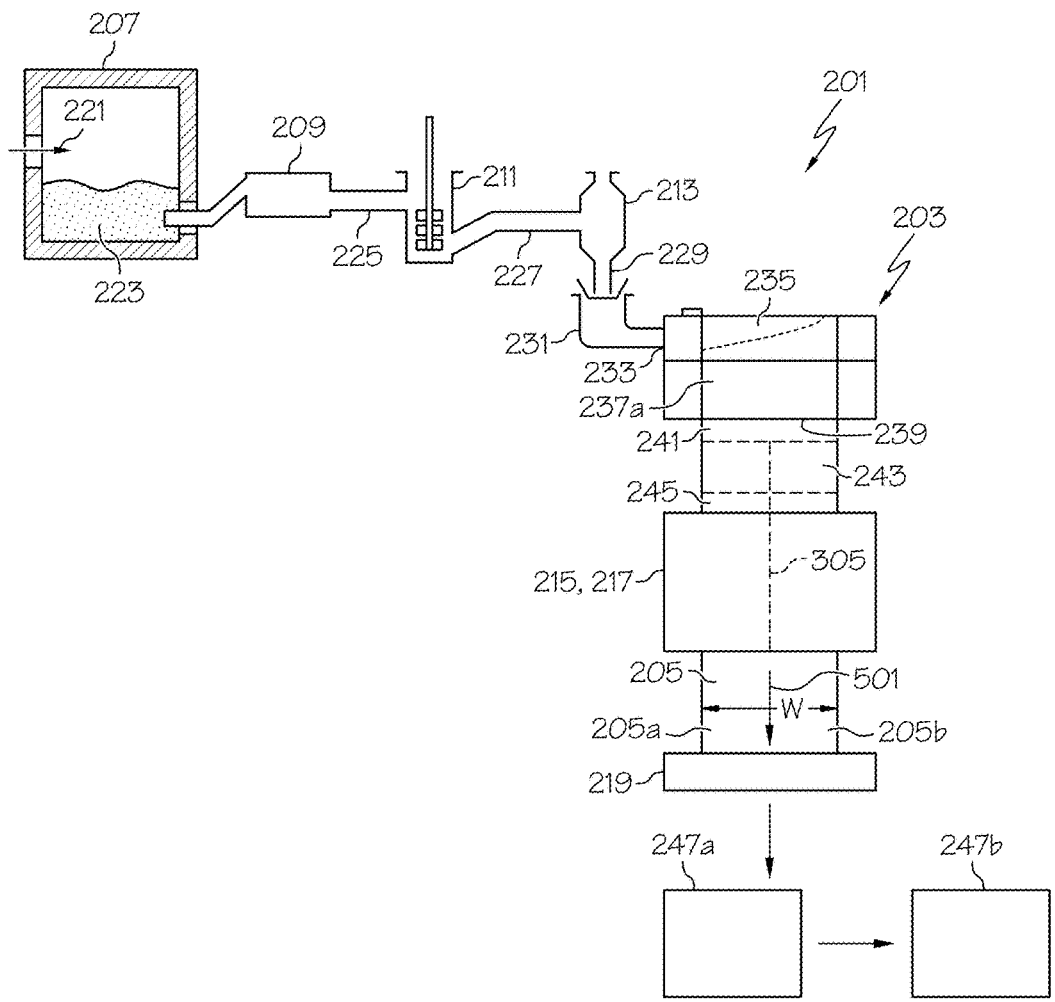
FIG. 2 schematically illustrates a glass manufacturing apparatus in accordance with examples of the disclosure.

FIG. 2 schematically illustrates a glass manufacturing apparatus 201 in accordance with examples of the disclosure. As shown, the glass manufacturing apparatus 201 may comprise a down draw fusion apparatus although other forming apparatus may be used in further examples. In one example, the glass manufacturing apparatus 201 can include a forming device 203 to produce a glass ribbon 205 including a width "W" extending between a first edge portion 205a and a second edge portion 205b of the glass ribbon 205.

As further illustrated in FIG. 2, the glass manufacturing apparatus 201 can include a melting vessel 207, a fining vessel 209, a mixing vessel 211, a delivery vessel 213, the forming device 203, a pull roll device 215, 217 and a separating device 219.

The melting vessel 207 is where the glass batch materials are introduced as shown by arrow 221 and melted to form molten glass 223. The fining vessel 209 has a high temperature processing area that receives the molten glass 223 (not shown at this point) from the melting vessel 207 and in which bubbles are removed from the molten glass 223. The fining vessel 209 is connected to the mixing vessel 211 by a finer to stir chamber connecting tube 225. The mixing vessel 211 is connected to the delivery vessel 213 by a stir chamber to bowl connecting tube 227. The delivery vessel 213 delivers the molten glass 223 through a downcomer 229 to an inlet 231 and into the forming device 203.

Figure 3:
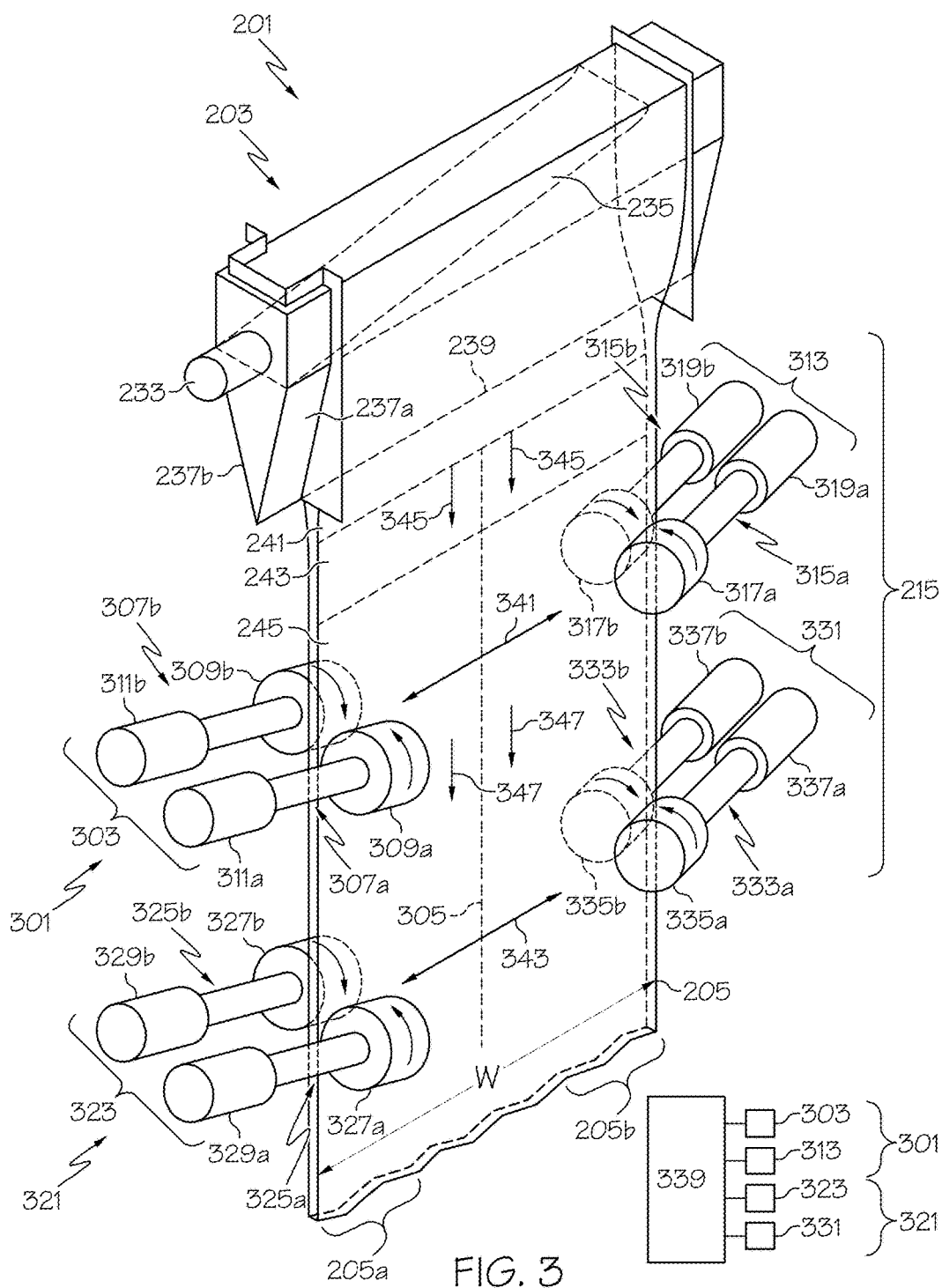
FIG. 3 is a schematic perspective view of portions of the glass manufacturing apparatus of FIG. 2 with an example pull roll device in accordance with aspects of the disclosure.

Various forming devices may be used in accordance with aspects of the disclosure. For example, as shown in FIGS. 2 and 3, the forming device 203 can include an opening 233 that receives the molten glass 223 which flows into a trough 235. As best shown in FIG. 3, the molten glass from the trough 235 then overflows and runs down two sides 237a and 237b before fusing together at a root 239 of the forming device 203. The root 239 is where the two sides 237a, 237b come together and where the two overflow walls of molten glass 223 flowing over each of the two sides 237a, 237b fuse together as the glass ribbon 205 is drawn downward off the root 239.

A portion of the glass ribbon 205 is drawn off the root 239 into a viscous zone 241 wherein the glass ribbon 205 begins to thin to a final thickness. The portion of the glass ribbon 205 is then drawn from the viscous zone 241 into a setting zone 243. In the setting zone 243, the portion of the glass ribbon 205 is set from a viscous state to an elastic state with the desired profile. The portion of the glass ribbon 205 is then drawn from the setting zone 243 to an elastic zone 245. Once in the elastic zone 245, the glass ribbon 205 may be deformed, within limits, without permanently changing the profile of the glass ribbon 205.

Turning back to FIG. 2, after the portion of the glass ribbon 205 enters the elastic zone 245, a separating device 219 may be provided to sequentially separate a plurality of glass sheets 247a, 247b from the glass ribbon 205 over a period of time. The separating device 219 may comprise the illustrated traveling anvil machine although further separating devices may be provided in further examples. The glass manufacturing apparatus 201 may also be provided without a separating device 219, such that the glass ribbon 205 can remain substantially continuous over a period of time.

The glass manufacturing apparatus 201 further includes a pull roll device 215, 217 schematically illustrated in FIG. 2. As discussed more fully below, the pull roll device 215, 217 may be provided to help draw the glass ribbon 205 from the root 239 and may isolate transmission of forces up the glass ribbon 205 from the elastic zone 245 to the setting zone 243. As such, the pull roll devices of the present disclosure can draw the glass ribbon to the desired thickness while also reducing residual stress within the glass sheet. As shown, the pull roll device 215, 217 can be located entirely within the elastic zone 245. Indeed, as illustrated in the drawings, the first and second pull roll apparatus (discussed more fully below) are both located within the elastic zone 245. In further examples, a portion of the pull roll device 215, 217 may be located in the setting zone 243. For example, the first pull roll apparatus may be located in the setting zone 243 while the second pull roll apparatus is located in the elastic zone 245. In still further examples, the pull roll device 215, 217 may be located entirely within the setting zone 243. For example, the first and second pull roll apparatus can both be located within the setting zone 243.

Figure 5:
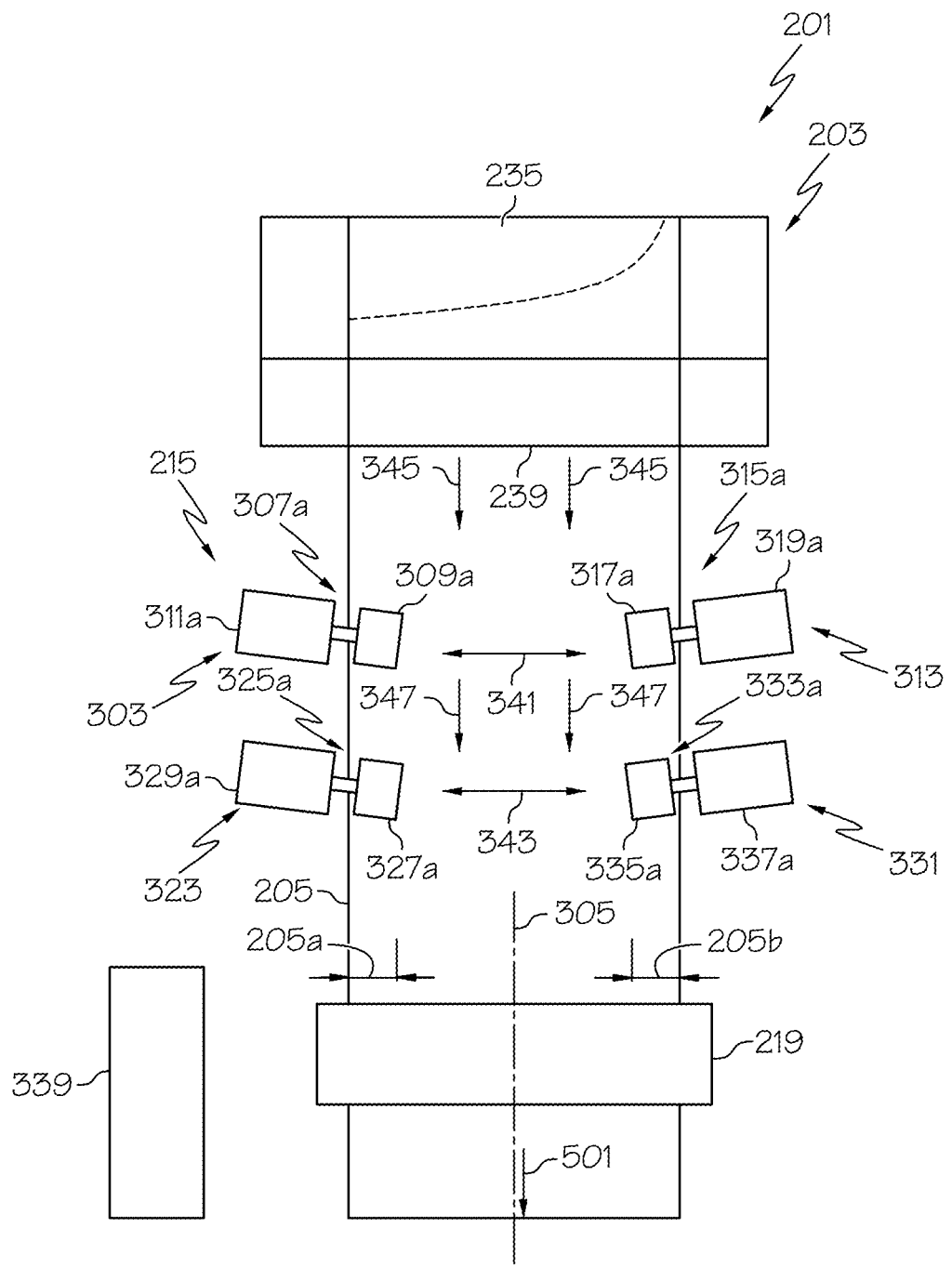
FIG. 5 is a front view of the example pull roll device illustrated in FIG. 3.
Figure 6:
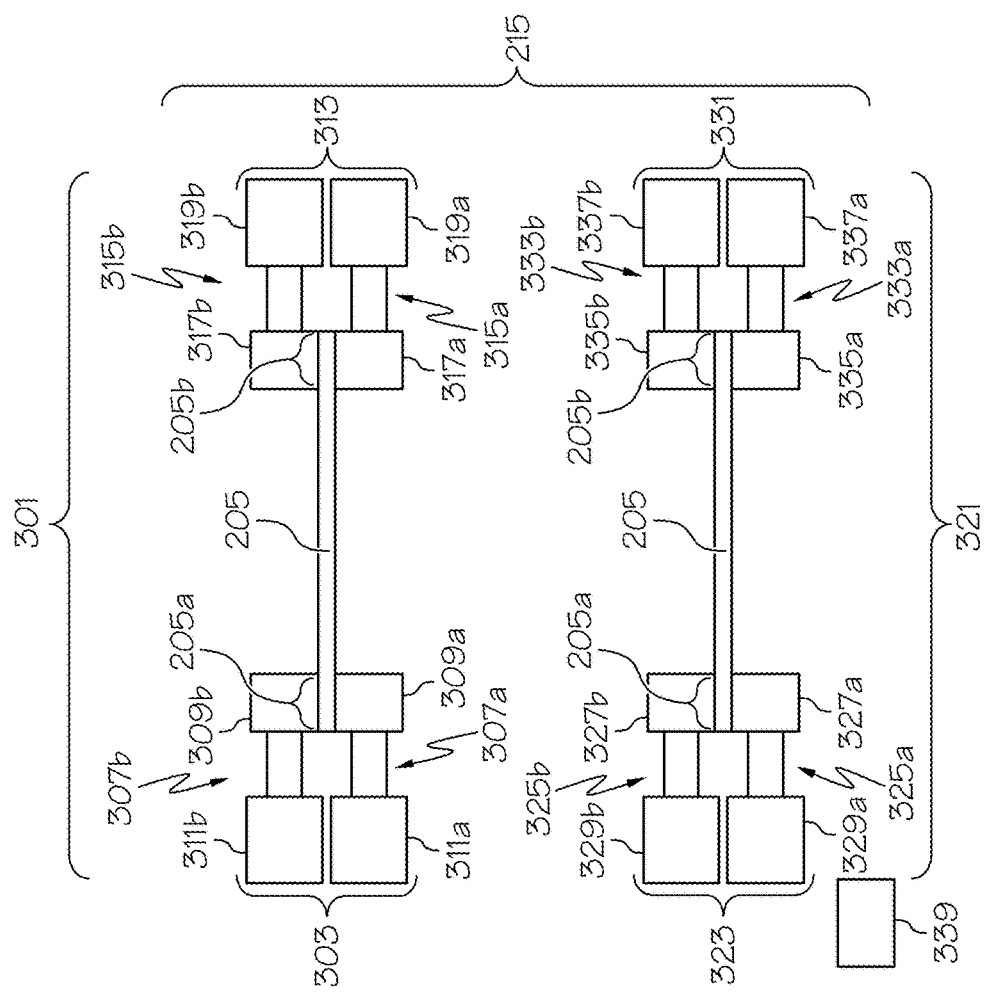
FIG. 6 is a top view of the first example pull roll apparatus and a second example pull roll apparatus of the example pull roll device of FIGS. 3 and 5.

FIG. 3 illustrates a first example of the pull roll device 215 in accordance with one example of the disclosure although other pull roll device 215 constructions may be provided in further examples. As shown in FIG. 3, the pull roll device 215 can include a first pull roll apparatus 301 including a first upstream pair of draw rolls 303 configured to draw the first edge portion 205a of the glass ribbon 205 from the forming device 203 along a draw path 305 extending transverse to the width "W" of the glass ribbon 205. As shown in FIG. 5, the glass ribbon 205 is drawn in a draw direction 501 along the draw path 305. As such, the first edge portion 205a is constantly maintained in tension between the first upstream pair of draw rolls 303 and a first downstream pair of draw rolls 323 throughout the period of time. In further examples, both forces may act in the positive or negative direction with respect to the draw direction 501 depending on the apparatus set up.

As further shown in FIG. 3, the first upstream pair of draw rolls 303 can include a first pull roll member 307a and a second pull roll member 307b. The first and second pull roll members 307a, 307b can each be provided with a respective refractory roll covering 309a, 309b configured to engage the first edge portion 205a of the glass ribbon 205 therebetween. At least one of the first and second pull roll members 307a, 307b may be provided with a respective motor 311a, 311b. For example, as shown, both the first and second pull roll members 307a, 307b can be provided with a respective motor 311a, 311b. In further examples, only one of the first and second pull roll members 307a, 307b may be provided with a motor wherein the other pull roll member may be provided with a bearing such that only one of the first and second pull roll members 307a, 307b is driven.

In another example, in addition or in alternative to the first upstream pair of draw rolls 303, the first pull roll apparatus 301 can include a second upstream pair of draw rolls 313 configured to draw the second edge portion 205b of the glass ribbon 205 from the forming device 203 along the draw path 305. As shown, the second upstream pair of draw rolls 313 can include a first pull roll member 315a and a second pull roll member 315b. The first and second pull roll members 315a, 315b can each be provided with a respective refractory roll covering 317a, 317b configured to engage the second edge portion 205b of the glass ribbon 205 therebetween. At least one of the first and second pull roll members 315a, 315b may be provided with a respective motor 319a, 319b. For example, as shown, both the first and second pull roll members 315a, 315b can be provided with a respective motor 319a, 319b. In further examples, only one of the first and second pull roll members 315a, 315b may be provided with a motor wherein the other pull roll member may be provided with a bearing such that only one of the first and second pull roll members 315a, 315b is driven.

The pull roll device 215 further includes a second pull roll apparatus 321 including a first downstream pair of draw rolls 323 positioned downstream along the draw path 305 from the first upstream pair of draw rolls 303, wherein the first downstream pair of draw rolls 323 are configured to further draw the first edge portion 205a of the glass ribbon 205 along the draw path 305. As shown, the first downstream pair of draw rolls 323 can include a first pull roll member 325a and a second pull roll member 325b. The first and second pull roll members 325a, 325b can each be provided with a respective refractory roll covering 327a, 327b configured to engage the first edge portion 205a of the glass ribbon 205 therebetween. At least one of the first and second pull roll members 325a, 325b may be provided with a respective motor 329a, 329b. For example, as shown, both the first and second pull roll members 325a, 325b may be provided with a respective motor 329a, 329b. In further examples, only one of the first and second pull roll members 325a, 325b may be provided with a motor wherein the other pull roll member may be provided with a bearing such that only one of the first and second pull roll members 325a, 325b is driven.

In another example, in addition or in alternative to the first downstream pair of draw rolls 323, the second pull roll apparatus 321 can include a second downstream pair of draw rolls 331 positioned downstream along the draw path 305 from the second upstream pair of draw rolls 313, wherein the second downstream pair of draw rolls 331 are configured to further draw the second edge portion 205b of the glass ribbon 205 along the draw path 305. As shown, the second downstream pair of draw rolls 331 can include a first pull roll member 333a and a second pull roll member 333b. The first and second pull roll members 333a, 333b can each be provided with a respective refractory roll covering 335a, 335b configured to engage the second edge portion 205b of the glass ribbon 205 therebetween. At least one of the first and second pull roll members 333a, 333b may be provided with a respective motor 337a, 337b. For example, as shown, both the first and second pull roll members 333a, 333b may be provided with a respective motor 337a, 337b. In further examples, only one of the first and second pull roll members 333a, 333b may be provided with a motor wherein the other pull roll member may be provided with a bearing such that only one of the first and second pull roll members 333a, 333b is driven.

In other examples (not shown), the pull roll device can include a third pull roll apparatus arranged at an elevation between the first pull roll apparatus and the second pull roll apparatus. In still other examples, the pull roll device can include any number of additional pull roll apparatus arranged at different elevations along the glass ribbon. The third and the any number of additional pull roll apparatus can include any or all of the features, in any combination, of the first pull roll apparatus and the second pull roll apparatus disclosed herein. Similarly, the third and the any number of additional pull roll apparatus can be configured to operate as disclosed herein.

The pull roll device 215 of the glass manufacturing apparatus 201 can further include a control device 339 (e.g., programmable logic controller) configured to (e.g., "programmed to", "encoded to", designed to", and/or "made to") operate the pull roll device, including the first pull roll apparatus 301 and/or the second pull roll apparatus 321.

In one example, the control device 339 can be configured to implement a control loop. The control loop can include various control parameters to operate the pull roll device 215, 217. For example, the control device 339 can be configured to implement a control loop including various control parameters to operate the pull roll device 215 to address long-term process drift. Long-term process drift can include, for example, changes to the glass manufacturing apparatus 201 including changes in characteristics of the glass ribbon 205 that can occur over a relatively long period of time. In one example, long-term process drift can occur over a relatively-long period of time in the order of hours.

In another example, long-term process drift can include a change in a characteristic of the glass ribbon 205 which can produce a corresponding change in an operating condition of at least one of the first pull roll apparatus 301 which rotates with a substantially constant torque and the second pull roll apparatus 321 which rotates with a substantially constant angular velocity. For instance, the operating condition can be a function of the characteristic of the glass ribbon 205. Still further, the corresponding change in the operating condition can affect, for example, a quality of the glass ribbon 205. For example, a change in a viscosity of the glass ribbon 205 at the root 239 can affect the tension force 345 of the glass being drawn from the root 239. The viscosity of the glass ribbon 205 at the root 239 can change due to, for example, changes in a temperature of the glass ribbon 205. The temperature of the glass ribbon 205 can change as a result of, for example, a thermal change of any one or combination of components of the glass manufacturing apparatus 201 and/or a thermal change of the surroundings. In addition to the control device 339, or in the alternative, thermal changes can be intentionally imparted on the glass manufacturing apparatus 201 including the glass ribbon 205 to control the change in temperature of the glass manufacturing apparatus 201 including the glass ribbon 205. As noted, such thermal changes can, for example, affect the viscosity of the glass ribbon 205 at the root 239.

In one example, to address long-term process drift, the control device 339 can be configured to implement a control loop which endeavors to keep a difference (delta) between a force applied to the glass ribbon 205 by the first pull roll apparatus 301 and a force applied to the glass ribbon 205 by the second pull roll apparatus 321 substantially constant. The difference (delta) between the force applied to the glass ribbon 205 by the first pull roll apparatus 301 and the force applied to the glass ribbon 205 by the second pull roll apparatus 321 can, for example, correspond to the vertical tension 347 in the glass ribbon 205 between the first pull roll apparatus 301 and the second pull roll apparatus 321. In one example, a change in the difference (delta) between the force applied to the glass ribbon 205 by the first pull roll apparatus 301 and the force applied to the glass ribbon 205 by the second pull roll apparatus 321 can correspond to a change in the vertical tension 347. In one example, the change in the vertical tension 347 can result in attribute variation, for example, variation in the residual stress of the glass ribbon 205, including variation in the residual stress in the first edge portion 205a and the second edge portion 205b of the glass ribbon 205. In still another example, the control device 339 can be configured to implement a control loop which works to keep a difference (delta) between a force applied to the glass ribbon 205 by the first pull roll apparatus 301 and a force applied to the glass ribbon 205 by the second pull roll apparatus 321 within a target range. In yet another example, the control device 339 can be configured to implement a control loop which works to keep a difference (delta) between a force applied to the glass ribbon 205 by the first pull roll apparatus 301 and a force applied to the glass ribbon 205 by the second pull roll apparatus 321 within a target range, subject to limitations. In another example, the control device 339 can be configured to implement a control loop which works to optimize the operation of the first pull roll apparatus 301 and the second pull roll apparatus 321.

In still another example, the control device 339 can be configured to implement a control loop which can remove short-term variations in operating conditions of the glass manufacturing apparatus 201, including the pull roll device 215. For example, the control device 339 can process, such as filter or average, data to account for the short-term variations in operating conditions. In another example, the control device 339 can be configured such that an operator, such as a person, can manually control the operation of the pull roll device. For example, the operator can engage or disengage, such as turn on and/or turn off, the control loop. In another example, the control device 339 can be configured to automatically operate the pull roll device 215 according to the features disclosed herein, such as automatically engaging or disengaging the control loop.

Still further, the control device 339 can be configured to implement a control scheme that controls the pull roll device 215. The control scheme can, for example, control various control limitations and control parameters of the pull roll device 215. In one example, the control scheme can include a target range of a difference between the force being applied to the glass ribbon 205 by the second pull roll apparatus 321 which rotates with a substantially constant angular velocity and the force being applied to the glass ribbon 205 by the first pull roll apparatus 301 which rotates with a substantially constant torque. In another example, if the difference between the force being applied to the glass ribbon 205 by the second pull roll apparatus 321 and the force being applied to the glass ribbon 205 by the first pull roll apparatus 301 is within the target range, the control device 339 can be configured to not change an operating condition of the pull roll device 215, such as the torque of the first pull roll apparatus 301. If, on the other hand, the difference between the force being applied to the glass ribbon 205 by the second pull roll apparatus 321 and the force being applied to the glass ribbon 205 by the first pull roll apparatus 301 is outside the target range, the control device 339 can be configured to adjust an operating condition of the pull roll device 215, such as the torque of the first pull roll apparatus 301. In one example, the adjusted torque of the first pull roll apparatus 301 can equal 0.5×(Present Delta−Delta Target); where Present Delta equals the difference between the force being applied to the glass ribbon 205 by the second pull roll apparatus 321 and the force being applied to the glass ribbon 205 by the first pull roll apparatus 301, at a particular point in time or over a period of time, and where Delta Target equals a target value or target range of the difference between the force being applied to the glass ribbon 205 by the second pull roll apparatus 321 and the force being applied to the glass ribbon 205 by the first pull roll apparatus 301.

In still another example, the control scheme can include a control parameter representing a time interval between adjustments to an operating condition of the pull roll device 215, such as the torque of the first pull roll apparatus 301. In one example, the time interval can be constant. In another example, the time interval can vary. In still another example, the time interval can be calculated and vary dynamically based on observed or monitored operating conditions of the pull roll device 215 and/or characteristics of the glass ribbon 205. In another example, a maximum and/or a minimum adjustment amount of an operating condition of the pull roll device 215, such as the torque of the first pull roll apparatus 301, can be defined such that the control device 339 can be configured to not make an adjustment of an operating condition of the pull roll device 215, such as the torque of the first pull roll apparatus 301, if the adjustment is determined to be greater than the maximum adjustment amount or less than the minimum adjustment amount. In still another example, if the adjustment is determined to be greater than the maximum adjustment amount or less than the minimum adjustment amount, the control device 339 can be configured to adjust an operating condition of the pull roll device 215, such as the torque of the first pull roll apparatus 301, such that the adjusted operating condition equals the maximum adjustment amount or the minimum adjustment amount, respectively. In yet another example, the control device 339 can be configured to disengage the control loop and/or the control scheme if an alarm condition is met. For example, the control device 339 can be configured to disengage the control loop and/or the control scheme if the force applied to the glass ribbon 205 by the first pull roll apparatus 301 and/or the second pull roll apparatus 321 is outside of a defined value or range, such as a traction limit, outside of which it is known that the pull roll device 215 may slip when applying force to the glass ribbon. Such slippage can cause attribute variation and/or degrade draw stability of the glass ribbon 205.

In another example, the control device 339 can be configured to independently operate the first pull roll apparatus 301 and the second pull roll apparatus 321. Independent operation of the first and second pull roll apparatus 301, 321, for purposes of this disclosure, means that one of the first and second pull roll apparatus 301, 321 may be operated without being affected by operation of the other of the first and second pull roll apparatus 301, 321. As such, for example, independently operating the first pull roll apparatus 301 with the control device 339 provides for the control device to operate the first pull roll apparatus 301 without considering changes in operating parameters of the second pull roll apparatus 321.

In still another example, the control device 339 can be configured to independently operate the first pull roll apparatus 301 and the second pull roll apparatus 321 such that the first pull roll apparatus 301 rotates with a substantially constant torque and the second pull roll apparatus 321 rotates with a substantially constant angular velocity. In another example, the control device 339 can be further configured to adjust the substantially constant torque of the first pull roll apparatus 301 based on an operating condition of at least one of the first pull roll apparatus 301 and the second pull roll apparatus 321. The operating condition can include any one of an operating condition or a combination of operating conditions of at least one of the first pull roll apparatus 301 and the second pull roll apparatus 321, such as any one of or a combination of a torque, an angular velocity, a temperature, or any other input, output, or internal state of at least one of the first pull roll apparatus 301 and the second pull roll apparatus 321.

In another example, the operating condition can include any one or a combination of operating conditions of the pull roll device 215, including any one or a combination of operating conditions of the first pull roll apparatus 301, including the first upstream pair of draw rolls 303, the first pull roll member 307a, the second pull roll member 307b, the respective refractory roll coverings 309a, 309b, the respective motors 311a, 311b the second upstream pair of draw rolls 313, the first pull roll member 315a, the second pull roll member 315b, the respective refractory roll coverings 317a, 317b, or the respective motors 319a, 319b.

In still another example, the operating condition can include any one or a combination of operating conditions of the pull roll device 215, including any one or a combination of operating conditions of the second pull roll apparatus 321, including the first downstream pair of draw rolls 323, the first pull roll member 325a, the second pull roll member 325b, the respective refractory roll coverings 327a, 327b, the respective motors 329a, 329b, the second downstream pair of draw rolls 331, the first pull roll member 333a, the second pull roll member 333b, the respective refractory roll coverings 335a, 335b, or the respective motors 337a, 337b.

In one example, the operating condition can be determined over a period of time. For example, the operating condition can be monitored, observed, recorded, or otherwise determined one time, incrementally, or continuously over a period of time. In another example, the operating condition can include a torque of at least one of the first pull roll apparatus 301 and the second pull roll apparatus 321. In still another example, the torque can be determined over a period of time. In another example, the operating condition can include an average torque of at least one of the first pull roll apparatus 301 and the second pull roll apparatus 321. The average torque can include any one or a combination of torques averaged among the pull roll device 215, including any one or a combination of torques averaged among the first pull roll apparatus 301, including the first upstream pair of draw rolls 303, the first pull roll member 307a, the second pull roll member 307b, the respective refractory roll coverings 309a, 309b, the respective motors 311a, 311b the second upstream pair of draw rolls 313, the first pull roll member 315a, the second pull roll member 315b, the respective refractory roll coverings 317a, 317b, or the respective motors 319a, 319b. In another example, the average torque can include any one or a combination of torques averaged among the pull roll device 215, including any one or a combination of torques averaged among the second pull roll apparatus 321, including the first downstream pair of draw rolls 323, the first pull roll member 325a, the second pull roll member 325b, the respective refractory roll coverings 327a, 327b, the respective motors 329a, 329b, the second downstream pair of draw rolls 331, the first pull roll member 333a, the second pull roll member 333b, the respective refractory roll coverings 335a, 335b, or the respective motors 337a, 337b. In still another example, the average torque can be determined over a period of time.

In another example, the operating condition can include a difference in torque between the first pull roll apparatus 301 and the second pull roll apparatus 321. The difference in torque can include any one or a combination of differences in torque between the first pull roll apparatus 301, including the first upstream pair of draw rolls 303, the first pull roll member 307a, the second pull roll member 307b, the respective refractory roll coverings 309a, 309b, the respective motors 311a, 311b the second upstream pair of draw rolls 313, the first pull roll member 315a, the second pull roll member 315b, the respective refractory roll coverings 317a, 317b, or the respective motors 319a, 319b and the second pull roll apparatus 321, including the first downstream pair of draw rolls 323, the first pull roll member 325a, the second pull roll member 325b, the respective refractory roll coverings 327a, 327b, the respective motors 329a, 329b, the second downstream pair of draw rolls 331, the first pull roll member 333a, the second pull roll member 333b, the respective refractory roll coverings 335a, 335b, or the respective motors 337a, 337b. In still another example, the difference in torque can be determined over a period of time.

In another example, the operating condition can include a difference in an average torque between the first pull roll apparatus 301 and the second pull roll apparatus 321. The difference in an average torque can include any one or a combination of differences in an average torque between the first pull roll apparatus 301, including the first upstream pair of draw rolls 303, the first pull roll member 307a, the second pull roll member 307b, the respective refractory roll coverings 309a, 309b, the respective motors 311a, 311b the second upstream pair of draw rolls 313, the first pull roll member 315a, the second pull roll member 315b, the respective refractory roll coverings 317a, 317b, or the respective motors 319a, 319b and the second pull roll apparatus 321, including the first downstream pair of draw rolls 323, the first pull roll member 325a, the second pull roll member 325b, the respective refractory roll coverings 327a, 327b, the respective motors 329a, 329b, the second downstream pair of draw rolls 331, the first pull roll member 333a, the second pull roll member 333b, the respective refractory roll coverings 335a, 335b, or the respective motors 337a, 337b. In still another example, the difference in an average torque can be determined over a period of time.

In another example, the control device 339 can be configured to independently operate the first pull roll apparatus 301 and the second pull roll apparatus 321 such that at least one of the first upstream pair of draw rolls 303 can rotate with a substantially constant torque and at least one of the first downstream pair of draw rolls 323 can rotate with a substantially constant angular velocity. In another example, the control device 339 can be further configured to adjust the substantially constant torque of the at least one of the first upstream pair of draw rolls 303 based on an operating condition of at least one of the first pull roll apparatus 301 and the second pull roll apparatus 321.

As mentioned previously, the first upstream pair of draw rolls 303 can include a single motor associated with one of the first or second pull roll members 307a, 307b. In such an example, the control device 339 can be configured to operate the single motor such that the associated first or second pull roll members 307a, 307b can rotate with a substantially constant torque. In another of such an example, the control device 339 can be configured to operate the single motor such that the associated first or second pull roll members 307a, 307b can rotate with a substantially constant adjusted torque based on an operating condition of at least one of the first pull roll apparatus 301 and the second pull roll apparatus 321.

As further described above, each of the first and second pull roll members 307a, 307b may be provided with a corresponding motor 311a, 311b. In some examples, the control device 339 can be configured to operate the motors 311a, 311b such that at least one, such as both, of the first upstream pair of draw rolls 303 rotates with a substantially constant torque. Rotating both pull roll members 307a, 307b of the first upstream pair of draw rolls 303 with a substantially constant torque may be desirable to, for example, apply force equally at both sides of the first edge portion 205a of the glass ribbon 205. In another of such examples, the control device 339 can be configured to operate the motors 311a, 311b such that at least one, such as both, of the first upstream pair of draw rolls 303 rotates with a substantially constant adjusted torque based on an operating condition of at least one of the first pull roll apparatus 301 and the second pull roll apparatus 321.

As mentioned previously, the first pull roll apparatus 301 may also include an optional second upstream pair of draw rolls 313. In such examples, the second upstream pair of draw rolls 313 can include a single motor associated with one of the first or second pull roll members 315a, 315b. In such an example, the control device 339 can be configured to operate the single motor such that the associated first or second pull roll members 315a, 315b can rotate with a substantially constant torque. In another of such an example, the control device 339 can be configured to operate the single motor such that the associated first or second pull roll members 315a, 315b can rotate with a substantially constant adjusted torque based on an operating condition of at least one of the first pull roll apparatus 301 and the second pull roll apparatus 321. As further described above, each of the first and second pull roll members 315a, 315b may be provided with a corresponding motor 319a, 319b. In such examples, the control device 339 may be configured to operate the motors 319a, 319b such that at least one, such as both, of the second upstream pair of draw rolls 313 rotates with a substantially constant torque. Rotating both pull roll members 315a, 315b of the second upstream pair of draw rolls 313 with a substantially constant torque may be desirable to, for example, apply force equally at both sides of the second edge portion 205b of the glass ribbon 205. In another of such examples, the control device 339 may be configured to operate the motors 319a, 319b such that at least one, such as both, of the second upstream pair of draw rolls 313 rotates with a substantially constant adjusted torque based on an operating condition of at least one of the first pull roll apparatus 301 and the second pull roll apparatus 321.

Although not required, in some examples, the control device 339 can be configured to operate one or both of the motors associated with the first upstream pair of draw rolls 303 with a substantially constant first torque and can be configured to simultaneously operate one or both of the motors associated with the second upstream pair of draw rolls 313 to rotate with a substantially constant second torque, In one example, the substantially constant first torque is substantially equal to the substantially constant second torque. Providing substantially equal first and second torques can be desirable to, for example, apply substantially the same force to the glass ribbon 205, including the first and second edge portions 205a, 205b of the glass ribbon 205.

Although not required, in other examples, the control device 339 can be configured to operate one or both of the motors associated with the first upstream pair of draw rolls 303 with a substantially constant adjusted first torque based on an operating condition of at least one of the first pull roll apparatus 301 and the second pull roll apparatus 321 and can be configured to simultaneously operate one or both of the motors associated with the second upstream pair of draw rolls 313 to rotate with a substantially constant adjusted second torque based on an operating condition of at least one of the first pull roll apparatus 301 and the second pull roll apparatus 321. In one example, the substantially constant adjusted first torque is substantially equal to the substantially constant adjusted second torque. Providing substantially equal first and second adjusted torques can be desirable to, for example, apply substantially the same force to the glass ribbon 205, including the first and second edge portions 205a, 205b of the glass ribbon 205.

As mentioned previously, the first downstream pair of draw rolls 323 can include a single motor associated with one of the first or second pull roll members 325a, 325b. In such an example, the control device 339 can be configured to operate the single motor such that the associated first or second pull roll members 325a, 325b rotate with a substantially constant angular velocity. As further described above, each of the first and second pull roll members 325a, 325b may be provided with a corresponding motor 329a, 329b. In such examples, the control device 339 may be configured to operate the motors 329a, 329b such that at least one, such as both, of the first downstream pair of draw rolls 323 rotates with a substantially constant angular velocity. Rotating both pull roll members 325a, 325b of the first downstream pair of draw rolls 323 with a substantially constant angular velocity may be desirable to, for example, draw the glass ribbon equally at both sides of the first edge portion 205a of the glass ribbon 205.

As mentioned previously, the second pull roll apparatus 321 may also include an optional second downstream pair of draw rolls 331. In such examples, the second downstream pair of draw rolls 331 can include a single motor associated with one of the first or second pull roll members 333a, 333b. In such an example, the control device 339 can be configured to operate the single motor such that the associated first or second pull roll members 333a, 333b rotate with a substantially constant angular velocity. As further described above, each of the first and second pull roll members 333a, 333b may be provided with a corresponding motor 337a, 337b. In such examples, the control device 339 may be configured to operate at least one, such as both, of the second downstream pair of draw rolls 331 to rotate with a substantially constant angular velocity. Rotating both pull roll members 333a, 333b of the second downstream pair of draw rolls 331 with a substantially constant angular velocity may be desirable to, for example, draw the glass ribbon equally at both sides of the second edge portion 205b of the glass ribbon 205.

Although not required, in some examples, the control device 339 can be configured to operate one or both of the motors associated with the first downstream pair of draw rolls 323 with a substantially constant first angular velocity and can be configured to simultaneously operate one or both of the motors associated with the second downstream pair of draw rolls 331 to rotate with a substantially constant second angular velocity that is substantially equal to the first angular velocity. Providing substantially equal first and second angular velocities can be desired to, for example, draw the glass ribbon 205 equally at the first and second edge portions 205a, 205b of the glass ribbon 205.

Figure 4:
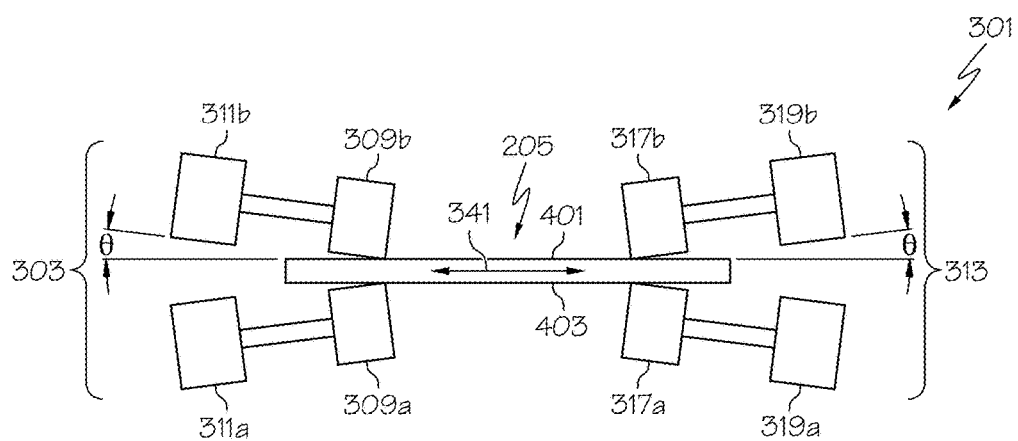
FIG. 4 is a top view of a first example pull roll apparatus of the example pull roll device of FIG. 3.

In some examples, the pull roll devices, including the first pull roll apparatus and the second pull roll apparatus discussed throughout the application may have similar constructions and orientations to those of the Shultz et al. patent and the Burdette et al. publication. For example, any of the pairs of draw rolls may be vertically downtilted or horizontally level rolls with respect to the glass ribbon. Moreover, as shown in FIG. 4, any of the pairs of rolls (horizontally level or downtilted) may be positioned to have a predetermined horizontal angle θ that a respective face of the rolls would be positioned relative to a respective major surface 401, 403 of the glass ribbon 205. The horizontal angle θ can be desirable to provide an appropriate level of cross-draw tension 341 and/or to accommodate a taper effect that may occur during normal roll wear.

FIG. 3 illustrates an example where each of the first and second upstream pair of draw rolls 303, 313 and each of the first and second downstream pair of draw rolls 323, 331 can comprise vertically downtilted rolls with respect to the glass ribbon 205. The downtilt angle of any pair of the draw rolls may be different or the same as any other pair of draw rolls depending on process considerations. Downtilting of the first and/or second upstream pair of draw rolls 303, 313 can provide a desired level of cross-draw tension 341 between the two pairs of draw rolls 303, 313. Likewise, downtilting the first and/or second downstream pair of draw rolls 323, 331 can provide a desired level of cross-draw tension 343 between the two pairs of draw rolls 323, 331.

In some examples, the control device 339 may be configured to activate an automatic positioner (not shown) or a manual mechanism may be used to adjust the downtilt position of the vertically downtilted rolls so as to control (or tune) the average cross-draw tension 341, 343 across the glass ribbon 205.

In further examples, one or more of the pairs of draw rolls may be horizontally level rolls with respect to the glass ribbon. For example, FIG. 7 shows the pull roll device 217 including pairs of draw rolls that may be horizontally level with respect to the glass ribbon wherein the rotation axis extends substantially perpendicular to the draw path 305 of the glass ribbon. Providing one or both of the pairs of rolls of the pull roll device as horizontally level rolls may be desired if cross-wise tension is not necessary across the width of the glass ribbon along the pairs of rolls.

FIGS. 7 and 8 also illustrate another example glass manufacturing apparatus 701 including the pull roll device 217 with a first pull roll apparatus 703 including a first upstream pair of draw rolls 705 including a first pull roll member 707a and a second pull roll member 707b. The first pull roll member 707a can include a first and second refractory roll covering 709a, 709b coupled to a first upper shank 711. Likewise, the second pull roll member 707b can include a first and second refractory roll covering 713a, 713b coupled to a second upper shank 715. The first refractory roll coverings 709a, 713a are configured to engage the first edge portion 205a of the glass ribbon 205 therebetween. Likewise, the second refractory roll coverings 709b, 713b are configured to engage the second edge portion 205b of the glass ribbon 205 therebetween.

At least one of the first and second pull roll members 707a, 707b may be provided with a respective motor 717a, 717b. For example, as shown, both the first and second pull roll members 707a, 707b can be provided with a respective motor 717a, 717b. The motor 717a can rotate the first upper shank 711 together with the first and second refractory roll coverings 709a, 709b coupled to the first upper shank 711. Likewise, the motor 717b can rotate the second upper shank 715 together with the first and second refractory roll coverings 713a, 713b coupled to the second upper shank 715. In further examples, only one of the first and second pull roll members 707a, 707b may be provided with a motor wherein the other pull roll member may be provided with a bearing such that only one of the first and second pull roll members 707a, 707b is driven.

The pull roll device 217 further includes a second pull roll apparatus 719 including a first downstream pair of draw rolls 721 positioned downstream along the draw path 305 from the first upstream pair of draw rolls 705. The first downstream pair of draw rolls 721 are configured to further draw the first edge portion 205a and the second edge portion 205b of the glass ribbon 205 along the draw path 305. The first downstream pair of draw rolls 721 include a first pull roll member 723a and a second pull roll member 723b. The first pull roll member 723a can include a first and second refractory roll coverings 725a, 725b coupled to a first lower shank 727. Likewise, the second pull roll member 723b can include a first and second refractory roll covering 729a, 729b coupled to a second lower shank 731. The first refractory roll coverings 725a, 729a are configured to engage the first edge portion 205a of the glass ribbon 205 therebetween. Likewise, the second refractory roll coverings 725b, 729b are configured to engage the second edge portion 205b of the glass ribbon 205 therebetween.

At least one of the first and second pull roll members 723a, 723b may be provided with a respective motor 733a, 733b. For example, as shown, both the first and second pull roll members 723a, 723b can be provided with a respective motor 733a, 733b. The motor 733a can rotate the first lower shank 727 together with the first and second refractory roll coverings 725a, 725b coupled to the first lower shank 727. Likewise, the motor 733b can rotate the second lower shank 731 together with the first and second refractory roll coverings 729a, 729b coupled to the second lower shank 731. In further examples, only one of the first and second pull roll members 723a, 723b may be provided with a motor wherein the other pull roll member may be provided with a bearing such that only one of the first and second pull roll members 723a, 723b is driven.

As shown in FIG. 7, the glass manufacturing apparatus 701 can further include a control device 339 configured to independently operate the first pull roll apparatus 703 and the second pull roll apparatus 719 such that at least one of the first upstream pair of draw rolls 705 rotates with a substantially constant torque and at least one of the first downstream pair of draw rolls 721 rotates with a substantially constant angular velocity. In one example, the control device 339 can be further configured to adjust the substantially constant torque of the at least one of the first upstream pair of draw rolls 705 based on an operating condition of at least one of the first pull roll apparatus 703 and the second pull roll apparatus 719. In another example, the control device 339 can be configured to operate the first pull roll apparatus 703 such that both of the first upstream pair of draw rolls 705 rotate with a substantially constant torque. In another example, the control device 339 can be further configured to adjust the substantially constant torque of both of the first upstream pair of draw rolls 705 based on an operating condition of at least one of the first pull roll apparatus 703 and the second pull roll apparatus 719. In another example, the control device 339 can be configured to operate the second pull roll apparatus 719 such that both of the first downstream pair of draw rolls 721 rotate with a substantially constant angular velocity.

As described above, each pull roll apparatus includes at least one motor. The motors can comprise servo motors that may optionally be provided with a gear box to drive the respective rolls. The servo motors, if provided, can provide torque and/or angular velocity measurements back to the control device 339 (e.g., programmable logic controller), the values of which may then be used by the control device 339 to implement the desired control scheme. Alternatively, the control device 339 may interact with other types of motor controllers such as variable frequency drives to control the angular velocity and/or torque of the respective motors. In this example, torque sensors and/or angular velocity sensors may be used to sense operating conditions and provide feedback of the sensed conditions to the control device 339.

Methods of manufacturing the glass ribbon 205 will now be described with respect to the pull roll device 215 illustrated in FIGS. 3-6 with the understanding that a similar, such as identical methods may be carried out to manufacture the glass ribbon 205 with the pull roll device 217 illustrated in FIGS. 7-8. The pull roll devices 215, 217 can be used to improve the consistency of a cross-draw tension and/or down-draw sheet tension in the glass ribbon which reduces residual stress and improves glass flatness on the manufactured glass ribbon. More specifically, the pull roll devices 215, 217 can be used to control and improve the consistency of the cross-draw tension and/or down-draw sheet tension in the area where the glass ribbon is passing through the setting zone where the product stress and flatness are set in the glass ribbon.

Referring to FIG. 3, the method can include the steps of forming the glass ribbon 205 including the width "W." The method can further include the step of independently operating the first pull roll apparatus 301 such that the first pull roll apparatus 301 rotates with a substantially constant torque to draw the glass ribbon 205 along a draw path 305 extending transverse to the width "W" of the glass ribbon 205. The method can further include the step of independently operating the second pull roll apparatus 321 such that the second pull roll apparatus 321 rotates with a substantially constant angular velocity to further draw the glass ribbon 205 along the draw path 305. The method can further include the step of adjusting the substantially constant torque of the first pull roll apparatus 301 based on an operating condition of at least one of the first pull roll 301 apparatus and the second pull roll apparatus 321.

In one example of the method, the operating condition can be determined over a period of time. In another example of the method, the operating condition can include a torque of at least one of the first pull roll apparatus 301 and the second pull roll apparatus 321. In still another example of the method, the torque can be determined over a period of time. In another example of the method, the operating condition can include an average torque of at least one of the first pull roll apparatus 301 and the second pull roll apparatus 321. In still another example of the method, the average torque can be determined over a period of time. In another example of the method, the operating condition can include a difference in torque between the first pull roll apparatus 301 and the second pull roll apparatus 321. In still another example of the method, the difference in torque can be determined over a period of time. In another example of the method, the operating condition can include a difference in an average torque between the first pull roll apparatus 301 and the second pull roll apparatus 321. In still another example of the method, the difference in an average torque can be determined over a period of time.

In another example, again referring to FIG. 3, the method can include the steps of providing the first pull roll apparatus 301 including the first upstream pair of draw rolls 303. In still another example, the first pull roll apparatus 301 may optionally be provided with a second upstream pair of draw rolls 313.

The method further includes the step of providing the second pull roll apparatus 321 including the first downstream pair of draw rolls 323 positioned downstream along the draw path 305 from the first upstream pair of draw rolls 303. In a further example, the second pull roll apparatus 321 may optionally be provided with a second downstream pair of draw rolls 331 positioned downstream along the draw path 305 from the second upstream pair of draw rolls 313.

The method further includes the step of forming the glass ribbon 205 with the width "W" extending between the first edge portion 205a and the second edge portion 205b. The first pull roll apparatus 301 can be independently operated, for example, with the control device 339 without input from the second pull roll apparatus 321. For instance, the first pull roll apparatus 301 can be independently operated such that at least one of the first upstream pair of draw rolls 303 rotates with a substantially constant torque to draw the first edge portion 205a of the glass ribbon 205 along the draw path 305. In one example, the substantially constant torque of the at least one of the first upstream pair of draw rolls 303 can be adjusted based on an operating condition of at least one of the first pull roll apparatus 301 and the second pull roll apparatus 321. In another example, the first pull roll apparatus 301 can be operated such that both of the first upstream pair of draw rolls 303 rotate with a substantially constant torque. In still another example, the substantially constant torque of both of the first upstream pair of draw rolls 303 can be adjusted based on an operating condition of at least one of the first pull roll apparatus 301 and the second pull roll apparatus 321.

The second upstream pair of draw rolls 313, if provided, can also be independently operated such that at least one of the second upstream pair of draw rolls 313 rotates with a substantially constant torque to draw the second edge portion 205b of the glass ribbon 205 along the draw path 305. In one example, the substantially constant torque of the at least one of the second upstream pair of draw rolls 313 can be adjusted based on an operating condition of at least one of the first pull roll apparatus 301 and the second pull roll apparatus 321. In another example, the first pull roll apparatus 301 can be operated such that both of the second upstream pair of draw rolls 313 rotate with a substantially constant torque. In still another example, the substantially constant torque of both of the second upstream pair of draw rolls 313 can be adjusted based on an operating condition of at least one of the first pull roll apparatus 301 and the second pull roll apparatus 321. As such, a desired tension 345 along the draw path 305 may be maintained in the glass ribbon 205 between the root 239 and the first pull roll apparatus 301.

The method further independently operates the second pull roll apparatus 321 such that at least one of the first downstream pair of draw rolls 323 rotates with a substantially constant angular velocity to further draw the first edge portion 205a of the glass ribbon 205 along the draw path 305. In one example, the method can include the step of operating the second pull roll apparatus 321 such that both of the first downstream pair of draw rolls 323 rotate with a substantially constant angular velocity.

The second downstream pair of draw rolls 331, if provided, can also be independently operated such that at least one of the second downstream pair of draw rolls 331 rotates with a substantially constant angular velocity to further draw the second edge portion 205b of the glass ribbon 205 along the draw path 305. In one example, the method can include the step of operating the second pull roll apparatus 321 such that both of the second downstream pair of draw rolls 331 rotate with a substantially constant angular velocity. As such, a desired tension 347 along the draw path 305 may be maintained in the glass ribbon 205 between the first pull roll apparatus 301 and the second pull roll apparatus 321.

The method can further include the step of sequentially separating a plurality of glass sheets 247a, 247b from the glass ribbon 205 over a period of time at a location downstream along the draw path 305 from the first downstream pair of draw rolls 323. For example, as shown in FIG. 2, the separating device 219 may be periodically activated to sequentially separate a plurality of glass sheets 247a, 247b as the glass ribbon 205 is drawn from the forming device 203. The method need not include the step of sequentially separating a plurality of glass sheets 247a, 247b from the glass ribbon 205 over a period of time at a location downstream along the draw path 305 from the first downstream pair of draw rolls 323. For example, the method may include the step of forming the glass ribbon 205 such that the glass ribbon 205 can remain substantially continuous over a period of time.

Figure 9:
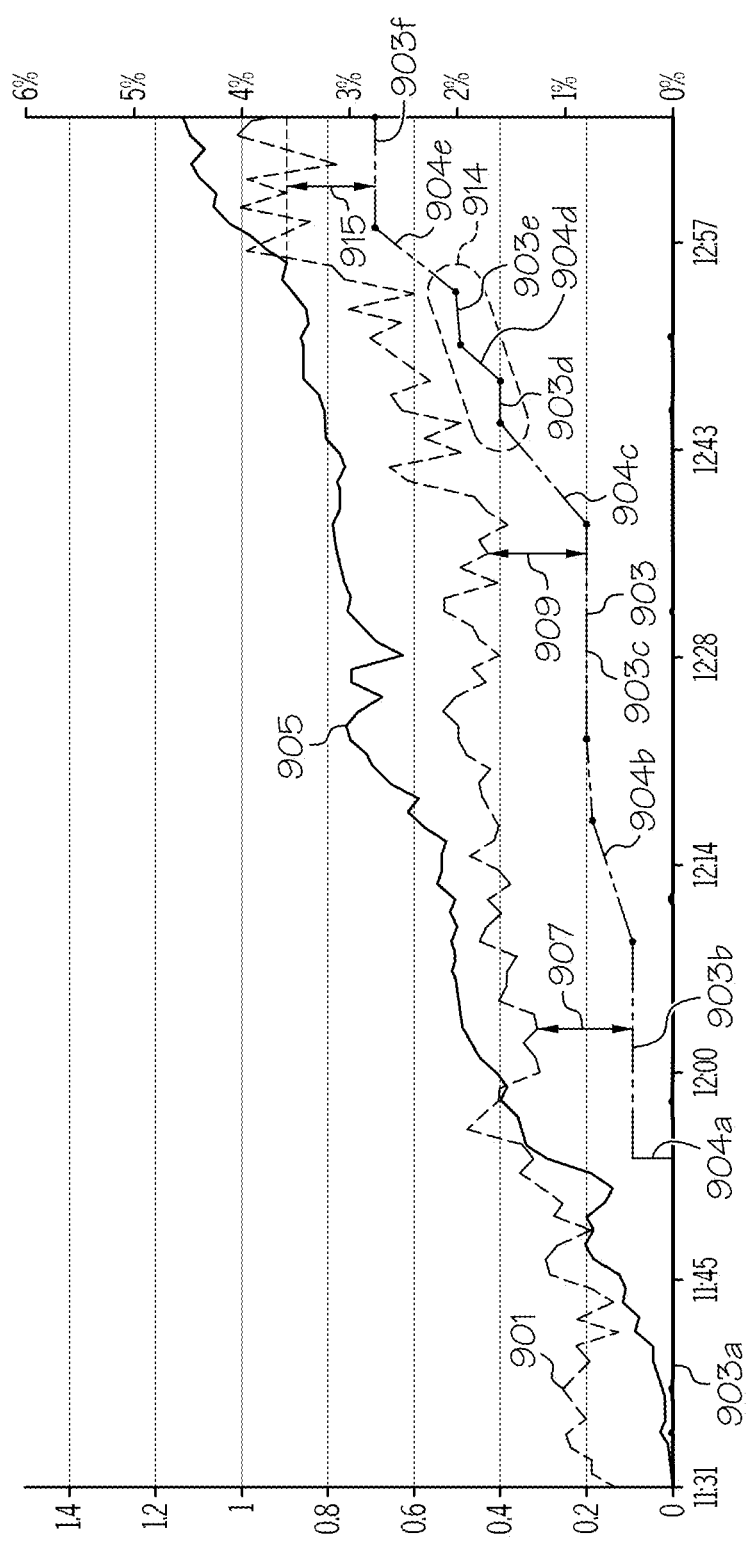
FIG. 9 illustrates a graph of example forces applied to the glass ribbon by a glass manufacturing apparatus with a pull roll device operating in accordance with examples of the disclosure.

FIG. 9 illustrates a graph of example changes in forces applied to the glass ribbon by a glass manufacturing apparatus in accordance with examples of the disclosure where the "left Y-axis" is a change in force (pounds), the "right Y-axis" is a change in viscosity of the glass ribbon 205 at the root 239 (%), and the X-axis is time (minutes:seconds). One plot 901 represents the change in force being applied to the glass ribbon 205 by the second pull roll apparatus 321 while the other plot 903 represents the change in force being applied to the glass ribbon 205 by the first pull roll apparatus 301. As shown, the plot 901 varies as the second pull roll apparatus 321 rotates with a substantially constant angular velocity and thus applies a varying force to the glass ribbon 205. As further shown, the plot 903 remains substantially constant over certain periods of time (e.g., 903a-f) as the first pull roll apparatus 301 rotates with a substantially constant torque and thus applies a substantially constant force to the glass ribbon 205. As demonstrated by the plot 903, the substantially constant torque of the first pull roll apparatus 301 can be adjusted at a point in time (e.g., 904a) such that the first pull roll apparatus 301 rotates with a substantially constant adjusted torque during a subsequent period of time 903b. As shown, the substantially constant torque of the first pull roll apparatus 301 can be changed instantaneously in the form of a stepped adjustment 904a. Alternatively, as further demonstrated by the plot 903, the substantially constant torque of the first pull roll apparatus 301 can be changed over a period of time (e.g., see 904b-e) between one period of time where the first pull roll apparatus 301 is rotating with a substantially constant torque and another period of time where the first pull roll apparatus 301 is rotating with a substantially constant adjusted torque. For example, as demonstrated by plot 903, the first pull roll apparatus 301 may be operated at a substantially constant torque during the period of time 903b and then may be adjusted over a period of time 904b until the first pull roll apparatus reaches an adjusted torque wherein it begins operating again at a substantially constant adjusted torque 903c over a subsequent period of time. As shown, the torque adjustment over the period of time 904b may be linear although nonlinear periods of adjustment times may be provided in further examples.

As further shown in FIG. 9, another plot 905 represents a change in viscosity of the glass ribbon 205 at the root 239 over a period of time. As shown, as the change in root viscosity (plot 905) increases, so too does the change in force being applied to the glass ribbon 205 by the second pull roll apparatus 321 (plot 901). A first force differential 907 represents a first difference (delta), at a first point in time, between the force being applied to the glass ribbon 205 by the second pull roll apparatus 321 which rotates with a substantially constant angular velocity (plot 901) and the force being applied to the glass ribbon 205 by the first pull roll apparatus 301 which rotates with a substantially constant torque (plot 903). A second force differential 909 represents a second difference (delta), at a second point in time, between the force being applied to the glass ribbon 205 by the second pull roll apparatus 321 which rotates with a substantially constant angular velocity (plot 901) and the adjusted force being applied to the glass ribbon 205 by the first pull roll apparatus 301 which rotates with a substantially constant adjusted torque (plot 903). As shown, the first force differential 907 and the second force differential 909 have substantially the same predetermined magnitude. Moreover, the control device 339 may be configured to maintain the force differential within a tolerance range from the predetermined magnitude. For instance, the force differential may be designed to be maintained within +/−10% of the predetermined magnitude. If the force differential begins operating outside this range, the algorithm may be designed to begin adjusting the torque of the first pull roll apparatus 301 to operate at an adjusted substantially constant torque to maintain the force differential. For example, with reference to FIG. 9, during the period of time associated with 903b, the force differential is maintained within a desired tolerance range. As such, the first pull roll apparatus 301 continues to operate at a substantially constant torque. However, as the force associated with the second pull roll apparatus 321 rises to the point where the force differential is outside of the tolerance range, the torque of the first pull roll apparatus 301 can be adjusted over a period of time (e.g. 904b) until the first pull roll apparatus 301 again is operated at a substantially constant torque while maintaining the predetermined magnitude of the force differential within a desired range. As such, the force differential can be maintained substantially constant or within a desired range. Maintaining the force differential of the force being applied to the glass ribbon 205 by the second pull roll apparatus 321 (plot 901) and the force being applied to the glass ribbon 205 by the first pull roll apparatus 301 (plot 903) substantially the same or within a desired range over a period of time can improve, for example, a quality of the glass ribbon 205.

As such, in one example, a method of manufacturing a glass ribbon comprises the step of forming a glass ribbon 205 including a width "W". The method further includes the step of independently operating a first pull roll apparatus 301 such that the first pull roll apparatus 301 rotates with a substantially constant torque to draw the glass ribbon 205 along a draw path 305 extending transverse to the width "W" of the glass ribbon 205. The method still further includes the step of independently operating a second pull roll apparatus 321 such that the second pull roll apparatus 321 rotates with a substantially constant angular velocity to further draw the glass ribbon 205 along the draw path 305. The method further includes the step of monitoring a force differential between the first pull roll apparatus 301 and the second pull roll apparatus 321. Indeed, as shown in FIG. 9, the glass manufacturing apparatus may be designed to monitor the first force differential 907, wherein such force differentials are determined over a period of time or include an average force differential over a period of time. If the monitored force differential 907 is within a predetermined range of force differentials (e.g., as shown by segment 903*b* in FIG. 9), the first pull roll apparatus 301 can continue to be independently operated to rotate with the substantially constant torque. However, if the force differential 907 begins operating outside of the predetermined range of force differentials, the method can further include the step of adjusting the substantially constant torque of the first pull roll apparatus (e.g., see segment 904*b* of FIG. 9) to an adjusted torque (see segment 903*c* in FIG. 9) in response to the force differential exceeding the predetermined range of force differentials. The method can then further include the step of continuing to independently operate the first pull roll apparatus 301 such that the first pull roll apparatus rotates with a substantially constant adjusted torque (see segment 903*c* in FIG. 9) while the force differential 909 is within the predetermined range of force differentials.

As mentioned previously, the substantially constant torque at which the first pull roll apparatus 301 rotates can be adjusted as a step adjustment 904*a* such that the force being applied to the glass ribbon 205 by the first pull roll apparatus 301 changes substantially instantaneously. Alternatively, as further discussed above, the substantially constant torque at which the first pull roll apparatus 301 rotates can be adjusted as a ramp adjustment (904*b-e*) such that the force being applied to the glass ribbon 205 by the first pull roll apparatus 301 changes over time. In still another example, the time interval during which the first pull roll apparatus 301 rotates with a substantially constant torque, the time interval during which the substantially constant torque is adjusted, and/or the time interval during which the first pull roll apparatus 301 rotates with a substantially constant adjusted torque can vary such that the force being applied to the glass ribbon 205 by the first pull roll apparatus 301 changes as shown, for example, by force pattern 914, to include varying limits with respect to the magnitude of adjustment, time of adjustment, and/or time between adjustment. In yet another example, the change in force applied to the glass ribbon 205 by the second pull roll apparatus 321 which rotates with a substantially constant angular velocity can be averaged over a period of time such that a third differential 915 represents a third average difference (delta), over a period of time, between the force being applied to the glass ribbon 205 by the second pull roll apparatus 321 which rotates with a substantially constant angular velocity (plot 901) and the adjusted force being applied to the glass ribbon 205 by the first pull roll apparatus 301 which rotates with a substantially constant adjusted torque (plot 903). As shown, in some examples, the first force differential 907, the second force differential 909, and the third force differential 915 may have substantially the same magnitude. As noted, this substantially constant difference (delta) or maintaining the force differential (delta) within a controlled range of force differentials (e.g., +/−10% of the target force differential) between the force being applied to the glass ribbon 205 by the second pull roll apparatus 321 (plot 901) and the force being applied to the glass ribbon 205 by the first pull roll apparatus 301 (plot 903) over a period of time can improve, for example, a quality of the glass ribbon 205.

It will be apparent to those skilled in the art that various modifications and variations can be made without departing from the spirit and scope of the claimed invention.

What is claimed is:

1. A method of manufacturing a glass ribbon comprising the steps of:
    forming a glass ribbon including a first edge portion, a second edge portion, and a width defined between an outer edge of the first edge portion and an outer edge of the second edge portion;
    independently operating a first pull roll apparatus such that the first pull roll apparatus rotates with a substantially constant torque to draw the glass ribbon along a draw path extending transverse to the width of the glass ribbon, the independently operating the first pull roll apparatus engaging the first edge portion without engaging a first central portion of a first major surface of the glass ribbon or a second central portion of a second major surface of the glass ribbon that are disposed between the first edge portion and the second edge portion;
    independently operating a second pull roll apparatus such that the second pull roll apparatus rotates with a substantially constant angular velocity to further draw the glass ribbon along the draw path; and
    adjusting the substantially constant torque of the first pull roll apparatus based on an operating condition of at least one of the first pull roll apparatus and the second pull roll apparatus.

2. The method of claim 1, wherein the operating condition is determined over a period of time.

3. The method of claim 1, wherein the operating condition includes a torque of at least one of the first pull roll apparatus and the second pull roll apparatus.

4. The method of claim 3, wherein the torque is determined over a period of time.

5. The method of claim 1, wherein the operating condition includes an average torque of at least one of the first pull roll apparatus and the second pull roll apparatus.

6. The method of claim 5, wherein the average torque is determined over a period of time.

7. The method of claim 1, wherein the operating condition includes a difference in torque between the first pull roll apparatus and the second pull roll apparatus.

8. The method of claim 7, wherein the difference in torque is determined over a period of time.

9. The method of claim 1, wherein the operating condition includes a difference in an average torque between the first pull roll apparatus and the second pull roll apparatus.

10. The method of claim 9, wherein the difference in an average torque is determined over a period of time.

11. The method of claim 1, wherein the independently operating the first pull roll apparatus further engages the second edge portion without engaging the first central portion or the second central portion.

12. The method of claim 1, wherein the independently operating the second pull roll apparatus engages the first edge portion without engaging the first central portion or the second central portion.

13. The method of claim 12, wherein the independently operating the first pull roll apparatus further engages the second edge portion without engaging the first central portion or the second central portion.

14. The method of claim 12, wherein the independently operating the second pull roll apparatus further engages the second edge portion without engaging the first central portion or the second central portion.

15. The method of claim 14, wherein the independently operating the first pull roll apparatus further engages the second edge portion without engaging the first central portion or the second central portion.

16. A method of manufacturing a glass ribbon comprising the steps of:
   (I) forming a glass ribbon including a first edge portion, a second edge portion, and a width defined between an outer edge of the first edge portion and an outer edge of the second edge portion;
   (II) independently operating a first pull roll apparatus such that the first pull roll apparatus rotates with a substantially constant torque to draw the glass ribbon along a draw path extending transverse to the width of the glass ribbon, the independently operating the first pull roll apparatus engaging the first edge portion without engaging a first central portion of a first major surface of the glass ribbon or a second central portion of a second major surface of the glass ribbon that are disposed between the first edge portion and the second edge portion;
   (III) independently operating a second pull roll apparatus such that the second pull roll apparatus rotates with a substantially constant angular velocity to further draw the glass ribbon along the draw path;
   (IV) monitoring a force differential between the first pull roll apparatus and the second pull roll apparatus;
   (V) adjusting the substantially constant torque of the first pull roll apparatus to an adjusted torque in response to the force differential exceeding a predetermined range of force differentials; and
   (VI) continuing to independently operate the first pull roll apparatus such that the first pull roll apparatus rotates with a substantially constant adjusted torque while the force differential is within the predetermined range of force differentials.

17. The method of claim 16, wherein step (V) comprises a stepped adjustment.

18. The method of claim 17, wherein step (VI) comprises a ramped adjustment over a period of time.

19. The method of claim 16, wherein the independently operating the first pull roll apparatus further engages the second edge portion without engaging the first central portion or the second central portion.

20. The method of claim 16, wherein the independently operating the second pull roll apparatus engages the first edge portion without engaging the first central portion or the second central portion.

21. The method of claim 20, wherein the independently operating the first pull roll apparatus further engages the second edge portion without engaging the first central portion or the second central portion.

22. The method of claim 20, wherein the independently operating the second pull roll apparatus further engages the second edge portion without engaging the first central portion or the second central portion.

23. The method of claim 22, wherein the independently operating the first pull roll apparatus further engages the second edge portion without engaging the first central portion or the second central portion.

* * * * *